(12) United States Patent
Tseng

(10) Patent No.: US 9,686,459 B2
(45) Date of Patent: Jun. 20, 2017

(54) METHOD FOR SWITCHING CAMERAS

(71) Applicant: PEGATRON CORPORATION, Taipei (TW)

(72) Inventor: Chung-Yi Tseng, Taipei (TW)

(73) Assignee: PEGATRON CORPORATION, Taipei (TW)

(*) Notice: Subject to any disclaimer, the term of this patent is extended or adjusted under 35 U.S.C. 154(b) by 0 days.

(21) Appl. No.: 14/882,469

(22) Filed: Oct. 14, 2015

(65) Prior Publication Data

US 2016/0112617 A1    Apr. 21, 2016

(30) Foreign Application Priority Data

Oct. 20, 2014   (TW) .............................. 103136168 A

(51) Int. Cl.
*H04N 5/225*  (2006.01)
*H04N 1/00*   (2006.01)
*H04N 5/232*  (2006.01)

(52) U.S. Cl.
CPC ....... *H04N 5/2258* (2013.01); *H04N 1/00307* (2013.01); *H04N 5/23245* (2013.01)

(58) Field of Classification Search
CPC ............. H04N 5/2258; H04N 5/23245; H04N 1/00307

USPC ......................................... 348/262, 374, 376
See application file for complete search history.

(56) References Cited

U.S. PATENT DOCUMENTS

2016/0037037 A1*   2/2016   Zou ....................... H04N 5/232
                                                   348/262

FOREIGN PATENT DOCUMENTS

CN          1272965 C      8/2006
CN          102685306 A    9/2012

* cited by examiner

*Primary Examiner* — Nhan T Tran
(74) *Attorney, Agent, or Firm* — CKC & Partners Co., Ltd.

(57) ABSTRACT

A method for switching cameras is disclosed. The method for switching cameras is used in an electronic device. The electronic device includes a first camera disposed at a first surface of the electronic device and a second camera disposed at a second surface of the electronic device different from the first surface. The method for switching cameras includes the following steps. Whether the first camera is covered is sensed when the first camera captures. When the first camera is covered, the first camera is disabled and the second camera is used to photograph.

10 Claims, 5 Drawing Sheets

METHOD FOR SWITCHING CAMERAS

CROSS-REFERENCE TO RELATED APPLICATIONS

This Non-provisional application claims priority under 35 U.S.C. §119(a) on Patent Application No(s). 103136168 filed in Taiwan, Republic of China on Oct. 20, 2014, the entire contents of which are hereby incorporated by reference.

BACKGROUND

Technology Field

This invention relates to a method for switching cameras and, more particularly, to a method for switching cameras used in an electronic device having a plurality of cameras.

Description of the Related Art

Since the semiconductor technology develops, smart mobile devices (such as mobile phones, tablet computers and so on) can equip more and more electronic components and periphery components. Currently, the smart mobile device can usually equip at least one front camera disposed at the surface having a screen and at least one rear camera disposed at the back surface of the smart mobile device. A conventional method for switching the front camera and the rear camera has to rely on a setting option of switching cameras in an operation interface. However, this method has a low switching speed, and further it makes a user have to find the setting option of switching cameras in the operation interface. In addition, disposing the setting option of switching cameras in the operation interface may degrade the fluency and the convenience in operation.

SUMMARY

Accordingly, one objective of the disclosure is to provide a method for switching cameras to switch cameras of an electronic device more fluently and conveniently The disclosure provides a method for switching cameras used in an electronic device. The electronic device includes a first camera disposed at a first surface of the electronic device and a second camera disposed at a second surface of the electronic device different from the first surface. The method for switching cameras includes the following steps: determining whether the first camera is covered when the first camera captures images; and disabling the first camera and enabling the second camera to capture images when the first camera is covered.

In one embodiment, the step of sensing whether the first camera is covered may include the following steps: capturing a sensed image via the first camera; and determining whether the sensed image is identical to a predetermined covered image.

In one embodiment, the step of determining whether the first camera is covered may further include the step of determining that the first camera is covered when the sensed image is identical to the predetermined covered image.

In one embodiment, the step of determining whether the sensed image is identical to a predetermined covered image may include the step of determining whether the average color level of the sensed image is identical to the average color level of the predetermined covered image.

In one embodiment, before the step of determining whether the sensed image is identical to a predetermined covered image, the method may include the step of processing the sensed image using with an edge detection algorithm.

In one embodiment, before the step of determining whether the sensed image is identical to a predetermined covered image, the method may further include the step of using the first camera to capture images when the sensed image has an edge.

In one embodiment, before the first camera captures images, the method may include the following steps: capturing a covered image by the first camera when a gesture of a user covers the first camera; and establishing the predetermined covered image according to the covered image.

In one embodiment, the step of establishing the predetermined covered image according to the covered image may include the following steps: calculating the average color level of the covered image; and storing the average color level of the covered image as the average color level of the predetermined covered image.

In one embodiment, the method for switching cameras may further include the step of disabling the first camera and the second camera when both the first camera and the second camera are covered.

In one embodiment, the first surface may be at the surface of the electronic device having a screen displaying the image captured by the first camera and the second camera of which one is enabled to capture images, and the second surface may be at the back surface opposite to the first surface.

Another objective of the disclosure is to provide an electronic device, which comprises a first surface; a second surface; a first camera, disposed at the first surface; a second camera, disposed at the second surface; and a processor, electrically connected to the first camera and the second camera, wherein the processor is used for enabling or disabling the first camera or the second camera, wherein when the first camera captures images and the processor detects the first camera is covered, the processor disables the first camera and enables the second camera.

In one embodiment, when the processor determined a sensed image captured by the first camera is identical to a predetermined covered image, the processor determines the first camera is covered.

In one embodiment, when the processor determines the average color level of the sensed image is identical to the average color level of the predetermined covered image, the processor determines the sensed image is identical to the predetermined covered image.

In one embodiment, the processor processes the sensed image with using an edge detection algorithm, when the processor determines the sensed image has an edge, the processor dose not disable the first camera.

In one embodiment, when the processor detects both the first camera and the second camera are covered, the processor disables both the first camera and the second camera.

In one embodiment, the electronic device further comprises a screen, wherein the first surface is at the surface of the screen.

As described, the first camera or the second camera can be switched rapidly to capture or be disabled by determining whether the first camera or the second camera is covered, allowing the camera of the electronic device to capture more fluently and conveniently.

BRIEF DESCRIPTION OF THE DRAWINGS

These and other features, aspects, and advantages of the present invention will become better understood with regard to the following description, appended claims, and accompanying drawings:

DETAILED DESCRIPTION

As used herein, the terms "about", "essentially", or "approximately" usually refers to that the error or the range of a value is within twenty percent, preferably within ten percent, and more preferably within five percent. Provided that the specification fails to explain explicitly, all the mentioned values are regarded as approximate values such as the errors or the ranges indicated by the terms "about", "essentially", or "approximately" or other approximate values.

In addition, as used herein, the terms "first", "second" and so on are not intended to represent the sequence, and they are not used for limiting the invention, either. Instead, they are only used for distinguishing elements or controls described with the same technical wordings.

Further, as used herein, the terms "comprise", "include", "have", "contain" and so on are all open-ended wordings meaning that the method or the device do not exclude those steps or elements that are not mentioned.

Figure 1A:
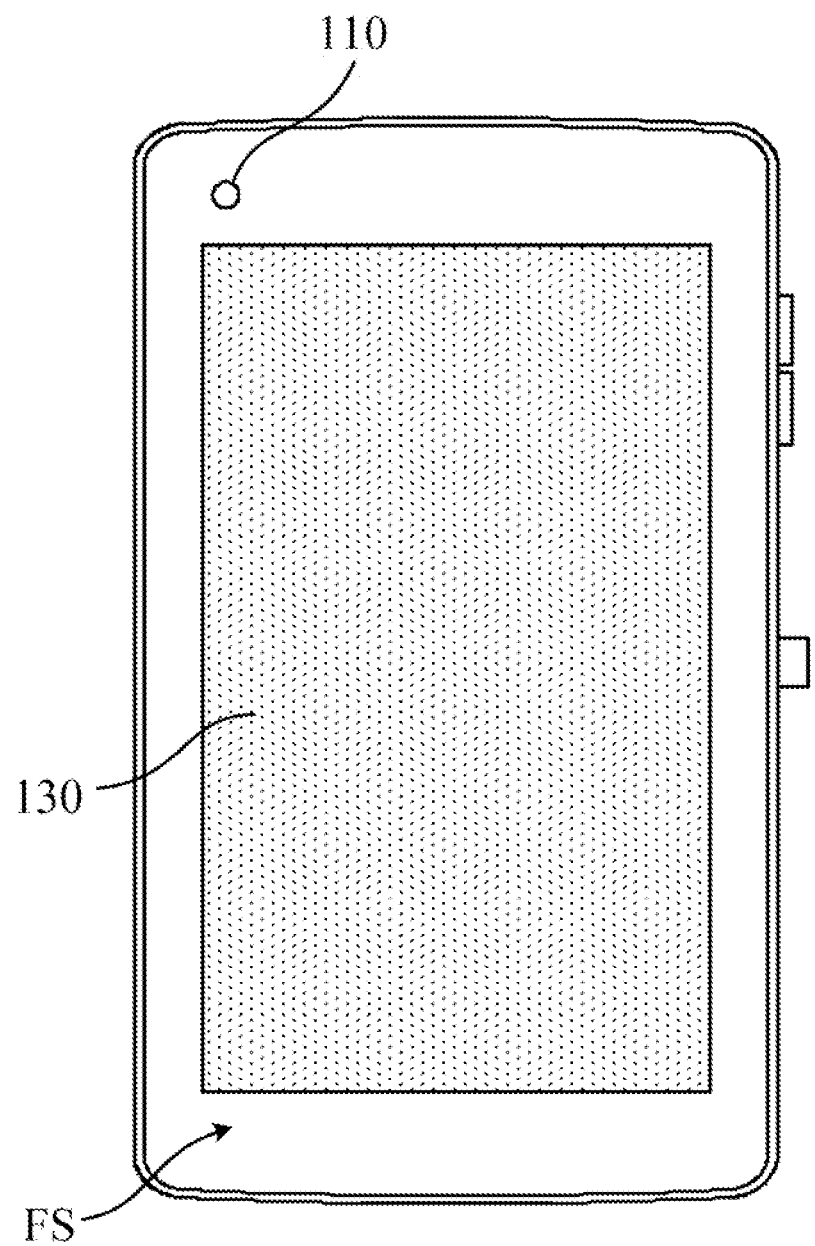
FIG. 1A is a front view showing an electronic device according to one embodiment of the invention.
Figure 1B:
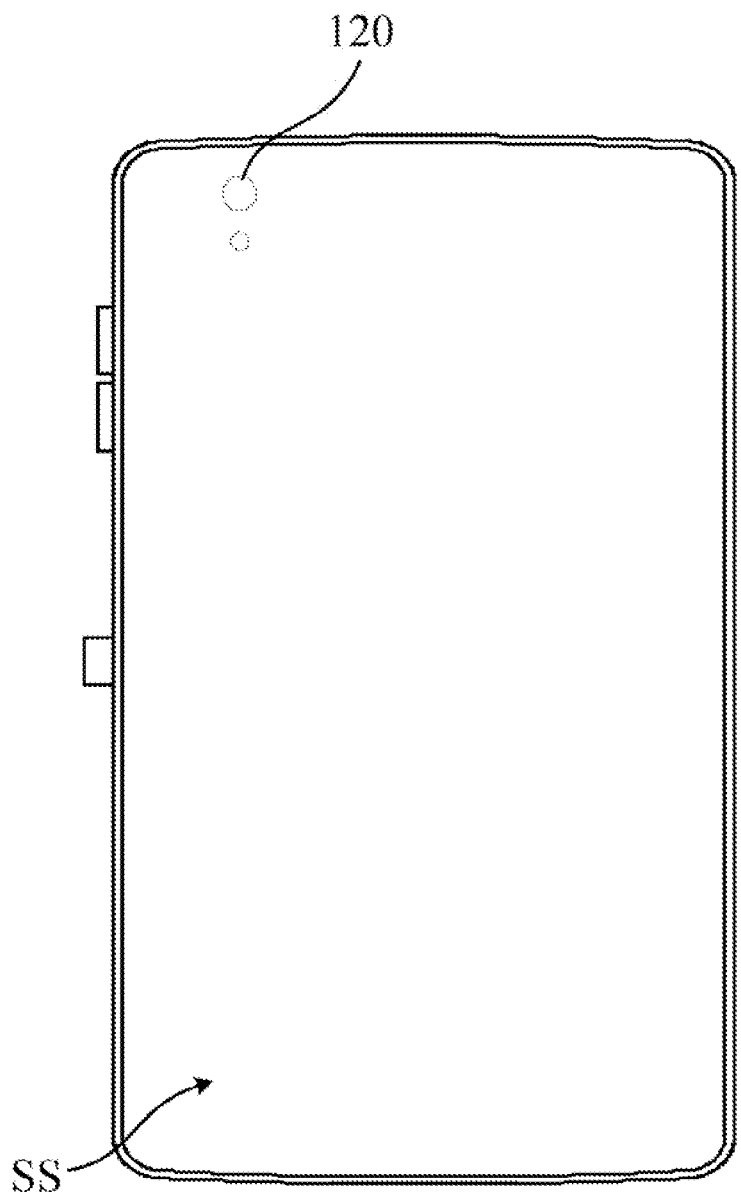
FIG. 1B is a back view showing an electronic device according to one embodiment of the invention.
Figure 2:
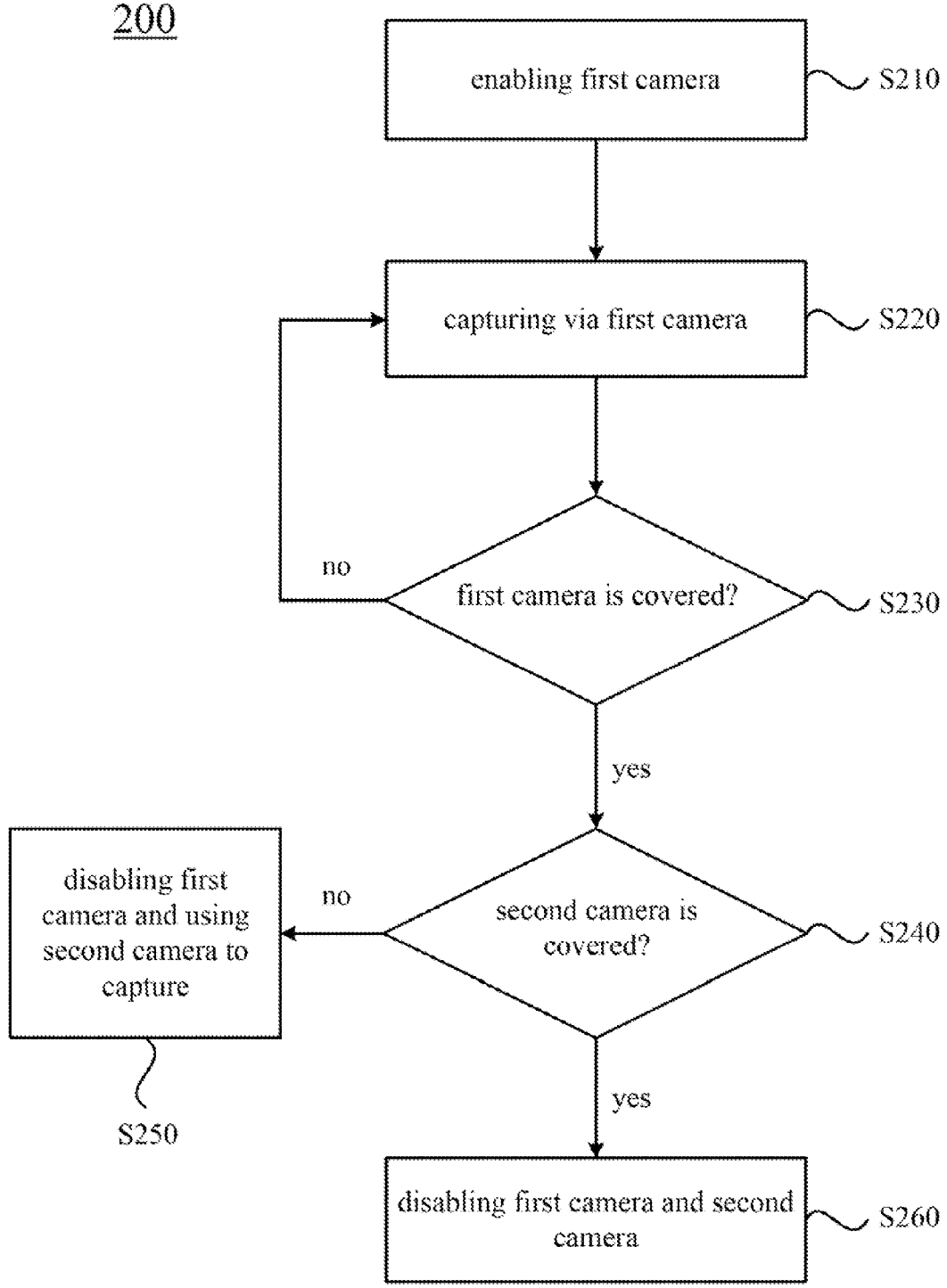
FIG. 2 is a flow chart showing a method for switching cameras according to one embodiment of the invention.

Please refer to FIG. 1A, FIG. 1B, and FIG. 2. FIG. 1A is a front view showing an electronic device 100 according to one embodiment of the invention; FIG. 1B is a back view showing the electronic device 100 according to one embodiment of the invention; FIG. 2 is a flow chart showing a method for switching cameras 200 according to one embodiment of the invention. The electronic device 100 can be a mobile communication device with a plurality of cameras such as a mobile phone or a tablet computer. In the embodiment, the electronic device 100 includes a first camera 110 and a second camera 120. However, the number of the cameras is not used for limiting the invention. In one embodiment, the electronic device 100 includes a processor (not shown).

In FIG. 1A and FIG. 1B, the first camera 110 and the second camera 120 are disposed at a first surface FS and a second surface SS of the electronic device 100, respectively. The first surface FS is different from the second surface SS. In the embodiment, the first surface FS is at the surface of the electronic device 100 having a screen 130 used for displaying the image captured by the first camera 110 and the second camera 120 of which one is enabled to capture images, and the second surface SS is at the back surface opposite to the first surface FS (i.e., the back housing of the electronic device 100). However, the invention is not limited thereto. In other words, the second surface SS can be disposed at any surface of the electronic device 100 according to actual needs.

The method for switching cameras 200 can be used for switching the first camera 110 and the second camera 120 of the electronic device 100, thus allowing one of the first camera 110 and the second camera 120 to capture. In FIG. 2, first, in step S210, the first camera 110 is enabled. Then in step S220, the first camera 110 captures. In one embodiment, the method for switching cameras 200 can be performed by the processor, but the invention is not limited thereto.

In S230, whether the first camera 110 is covered is determined. When the first camera 110 is not covered, return to the step S220 to continue using the first camera 110 to capture. When the first camera 110 is covered, step S240 is executed.

In the step S240, whether the second camera 120 is covered is determined. When the second camera 120 is not covered, step S250 is executed. In the step S250, the first camera 110 is disabled and the second camera 120 is used to capture. That is, the first camera 110 originally capturing is switched to the second camera 120 for capturing.

In addition, when the first camera 110 is covered and the second camera 120 is covered as well, step S260 is executed. In the step S260, the first camera 110 and the second camera 120 are disabled.

It should be noted that in the steps S210 to S250 of the method for switching cameras 200, the second camera 120 can be enabled to capture first, and whether the capturing camera is switched to the first camera 110 or whether the first camera 110 and the second camera 120 are directly disabled is determined by whether the second camera 120 is covered. In other words, when one of the first camera 110 and the second camera 120 captures, whether the other one not capturing currently is switched to capture is determined by capturing whether the camera capturing currently is covered.

For example, when a user captures using the first camera 110, he or she can cover the first camera 110 via a gesture or other objects to switch to the second camera 120 for capturing. When the electronic device 100 determines that the first camera 110 is covered, the camera capturing currently (i.e. the first camera 110) is disabled and is switched to the second camera 120. Similarly, when the user is to switch to the first camera 110 for capturing, he or she can cover the second camera 120 via a gesture or other objects. At this moment, the electronic device 100 determines that the second camera 120 is covered, it disables the camera capturing currently (i.e. second camera 120) and switches the second camera 120 to the first camera 110 for capturing. In addition, when the user is not intended to capture, he or she can cover the first camera 110 and the second camera 120 simultaneously via a gesture or other objects. When the electronic device 100 determines that the first camera 110 and the second camera 120 are covered simultaneously, it disables the first camera 110 and the second camera 120.

Accordingly, the first camera 110 or the second camera 120 can be switched rapidly to capture or be disabled by capturing whether the first camera 110 or the second camera 120 is covered, allowing the camera (such as the first camera 110 and the second camera 120) of the electronic device 100 (such as a mobile phone or a tablet computer) to capture more fluently and conveniently.

Figure 3:
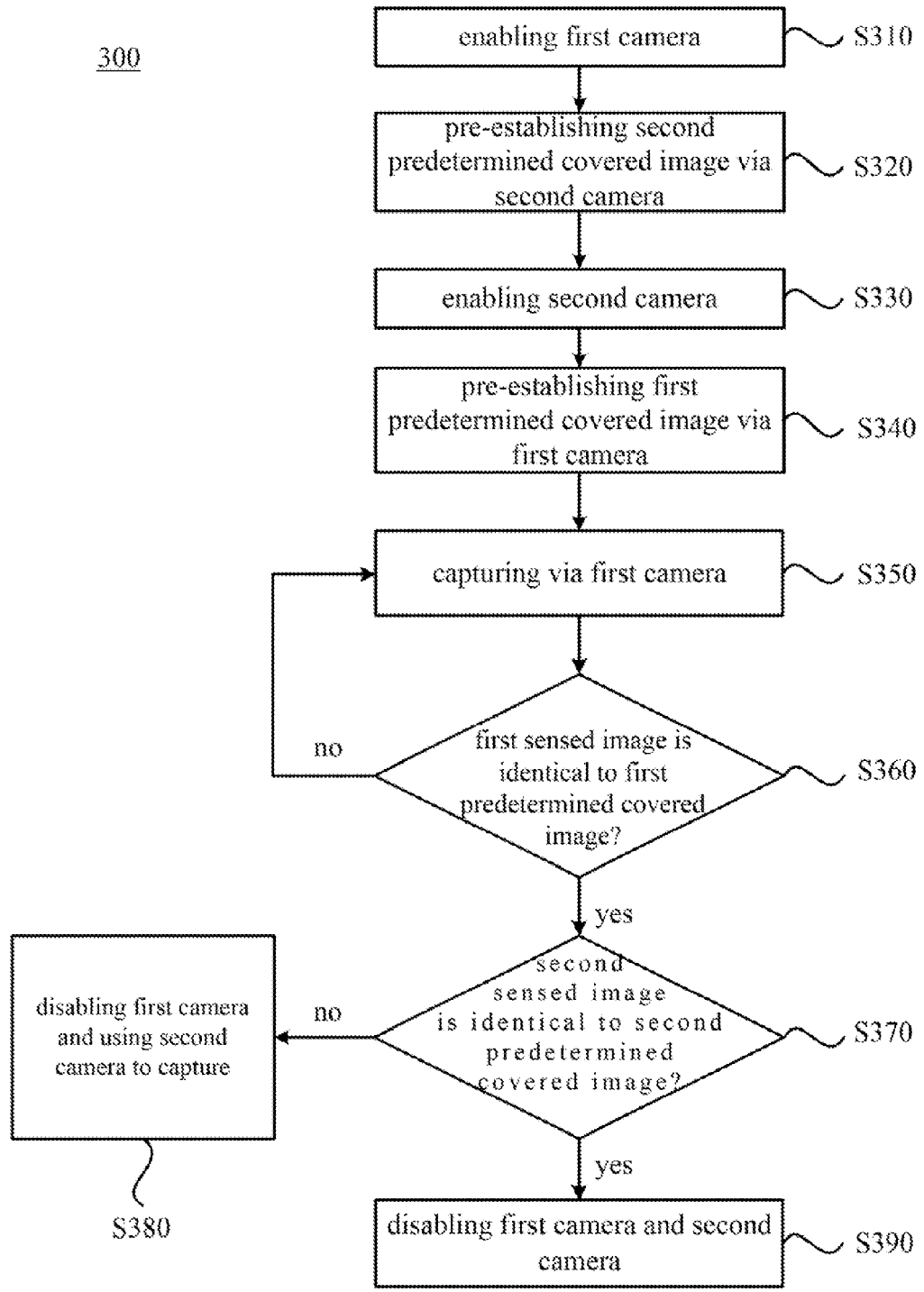
FIG. 3 is a flow chart showing a method for switching cameras according to another embodiment of the invention.

Please refer to FIG. 3. FIG. 3 is a flow chart showing a method for switching cameras 300 according to another embodiment of the invention. The method for switching cameras 300 can be used in the electronic device 100 in FIG. 1. However, the invention is not limited thereto. In FIG. 3, first, in step S310, the first camera 110 is enabled. In step S320, a first predetermined covered image is pre-built via the first camera 110. In operation, the user can cover the first camera 110 via a gesture or other objects. Then a current first covered image is captured via the first camera 110 and the first predetermined covered image is built according to the first covered image. In one embodiment, the user calculates the average color level of the first covered image via a processor or a calculating unit (not shown) of the electronic device 100, and stores the average color level of the first covered image as the average color level of the first predetermined covered image. Accordingly, whether the first camera 110 is covered can be determined. For example, when the user covers the first camera 110 via a gesture, the electronic device 100 stores the color level of RGB pixel of eighty percent pixels in the first covered image captured by the first camera 110 (such as R:163, G:21, B:2) as the average color level of the first predetermined covered image.

Then in step S330, the first camera 110 is disabled and the second camera 120 is enabled. In step S340, a second predetermined covered image is pre-built via the second camera 120. Similarly, the user can cover the second camera 120 via a gesture or other objects. Then a second covered image is captured via the second camera 120, and the second predetermined covered image is built according to the second covered image. Similarly, the user can calculate the average color level of the second covered image via the processor or the calculating unit (not shown) of the electronic device 100, and stores the average color level of the second covered image as the average color level of the second predetermined covered image. Accordingly, whether the second camera 120 is covered can be determined. For example, when the user covers the second camera 120 via a gesture, the electronic device 100 stores the color level of RGB pixel of eighty percent pixels in the second covered image captured by the second camera 120 (such as R:144, G:35, B:10) as the average color level of the second predetermined covered image.

It should be noted that the sequences of the steps S310 to S320 and the steps S330 to S340 can be exchanged according to the actual needs. That is, the second camera 120 can obtain the corresponding predetermined covered image prior to the first camera 110. The invention is not limited thereto.

In step S350, the first camera 110 captures and captures a first sensed image via the first camera 110. Then in step S360, whether the first sensed image is essentially identical to the first predetermined covered image is determined.

When the first sensed image is not essentially identical to the first predetermined covered image, i.e., the first camera 110 is not covered, return to the step S350. When the first sensed image is essentially identical to the first predetermined covered image, i.e., the first camera 110 is covered, step S370 is executed.

In the step S370, whether a second sensed image captured via the second camera 120 is essentially identical to the second predetermined covered image is determined.

When the second sensed image is not essentially identical to the second predetermined covered image, i.e., only the first camera 110 is covered, step S380 is executed. In the step S380, the first camera 110 is disabled and the second camera 120 is used for capturing. That is, the first camera 110 originally capturing is switched to the second camera 120 for capturing.

When the second sensed image is essentially identical to the second predetermined covered image, i.e., both the first camera 110 and the second camera 120 are covered, step S390 is executed. In the step S390, the first camera 110 and the second camera 120 are disabled.

Accordingly, whether the first camera 110 or the second camera 120 is covered is determined via determining whether the sensed image captured by the first camera 110 or the second camera 120 is identical to the corresponding predetermined covered image to allow the first camera 110 or the second camera 120 to be switched rapidly to capture or be disabled, thus allowing the camera (such as the first camera 110 and the second camera 120) of the electronic device 100 (such as a mobile phone or a tablet computer) to capture more fluently and conveniently.

Similarly, in the steps S350 to S380 of the method for switching cameras 300, the second camera 120 can be enabled to capture first, and whether the capturing camera is switched to the first camera 110 or whether the first camera 110 and the second camera 120 are directly disabled is determined by whether the second camera 120 is covered. In other words, when one of the first camera 110 and the second camera 120 captures images, whether the other one not capturing currently is switched to capture is determined by whether the camera capturing currently is covered.

Figure 4:
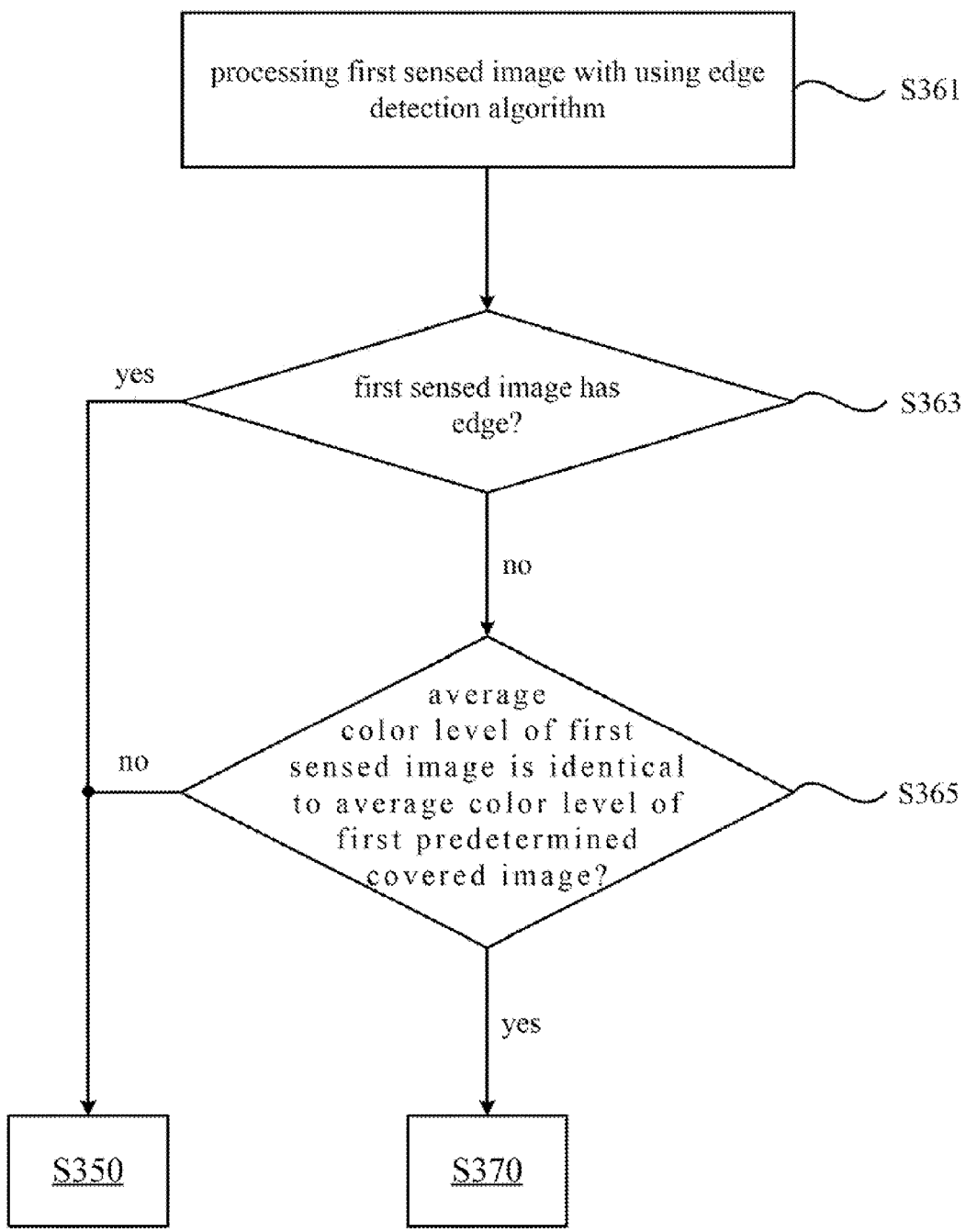
FIG. 4 is a flow chart showing one step of a method for switching cameras according to one embodiment of the invention.

In one embodiment, the step S360 further includes steps S361 to S367 in FIG. 4. FIG. 4 is a flow chart showing the step S360 of the method for switching cameras 300 according to one embodiment of the invention. First, in step S361, the first sensed image captured by the first camera 110 is processed with using an edge detection algorithm. In one embodiment, the edge detection algorithm can determine whether the image has an edge by calculating the gradient of each pixel in the image.

Second, in step S363, whether the first sensed image has an edge is determined. When the first sensed image has the edge, it means that the first camera 110 may not be totally covered or be capturing, i.e., no situation of covering occurs. At this moment, return to the step S350.

When the first sensed image does not have any edge, it means that the first camera 110 may be totally covered. Then step S365 is executed. In the step S365, whether the average color level of the first sensed image is essentially identical to the average color level of the first predetermined covered image is determined.

When the average color level of the first sensed image is not essentially identical to the average color level of the first predetermined covered image, it means that the first camera 110 is not covered and is capturing, i.e., no situation of covering occurs. At this moment, return to the step S350.

When the average color level of the first sensed image is essentially identical to the average color level of the first predetermined covered image, it means that the first camera 110 is covered. At this moment, the step S370 is executed.

Similarly, the step S370 can include the steps S361 to S367 as well as the step S360 thus to determine whether the second sensed image captured by the second camera 120 is essentially identical to the second predetermined covered image, i.e., to determine whether the second camera 120 is covered. The detailed operation can refer to FIG. 4 and the related description, and here it is not described for concise purpose.

As described above, whether the first camera 110 or the second camera 120 is covered is determined via determining whether the sensed image captured by the first camera 110 or the second camera 120 is identical to the corresponding predetermined covered image to allow the first camera 110 or the second camera 120 to be switched rapidly to capture or be disabled, thus allowing the camera (such as the first camera 110 and the second camera 120) of the electronic device 100 (such as a mobile phone or a tablet computer) to capture more fluently and conveniently.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A method for switching cameras used in an electronic device, the electronic device including a first camera disposed at a first surface of the electronic device and a second camera disposed at a second surface of the electronic device different from the first surface, the method for switching cameras comprising the following steps of:
   determining whether the first camera is covered when the first camera captures images, wherein the step of determining whether the first camera is covered comprises the steps of:
      capturing a sensed image via the first camera;
      determining whether the sensed image is identical to a predetermined covered image; and
      determining that the first camera is covered when the sensed image is identical to the predetermined covered image;
   disabling the first camera and enabling the second camera to capture images when the first camera is covered;
   processing the sensed image with using an edge detection algorithm; and
   not disabling the first camera to capture images when the sensed image has an edge.

2. The method for switching cameras according to claim 1, wherein the step of determining whether the sensed image is identical to a predetermined covered image comprises the step of:
   determining whether the average color level of the sensed image is identical to the average color level of the predetermined covered image.

3. The method for switching cameras according to claim 1, wherein before the first camera captures images, the method comprises the steps of:
   capturing a covered image by the first camera when a gesture of a user covers the first camera; and
   establishing the predetermined covered image according to the covered image.

4. The method for switching cameras according to claim 3, wherein the step of establishing the predetermined covered image according to the covered image comprises the steps of:
   calculating the average color level of the covered image; and
   storing the average color level of the covered image as the average color level of the predetermined covered image.

5. The method for switching cameras according to claim 1, further comprising the step of:
   disabling the first camera and the second camera when both the first camera and the second camera are covered.

6. The method for switching cameras according to claim 1, wherein the first surface is at the surface of the electronic device having a screen displaying the image captured by the first camera and the second camera of which one is enabled to capture images, and the second surface is at the back surface opposite to the first surface.

7. An electronic device, comprising:
   a first surface;
   a second surface;
   a first camera, disposed at the first surface;
   a second camera, disposed at the second surface; and
   a processor, electrically connected to the first camera and the second camera, wherein the processor is used for enabling or disabling the first camera or the second camera, wherein when the first camera captures images and the processor detects the first camera is covered, the processor disables the first camera and enables the second camera, wherein when the processor determined a sensed image captured by the first camera is identical to a predetermined covered image, the processor determines the first camera is covered, wherein the processor processes the sensed image with using an edge detection algorithm, when the processor determines the sensed image has an edge, the processor does not disable the first camera.

8. The electronic device according to claim 7, wherein when the processor determines the average color level of the sensed image is identical to the average color level of the predetermined covered image, the processor determines the sensed image is identical to the predetermined covered image.

9. The electronic device according to claim 7, wherein when the processor detects both the first camera and the second camera are covered, the processor disables both the first camera and the second camera.

10. The electronic device according to claim 7, further comprising a screen, wherein the first surface is at the surface of the screen.

* * * * *